(No Model.)
W. R. JENKINS, Jr.
SELF LUBRICATING CAR WHEEL.
No. 307,307. Patented Oct. 28, 1884.
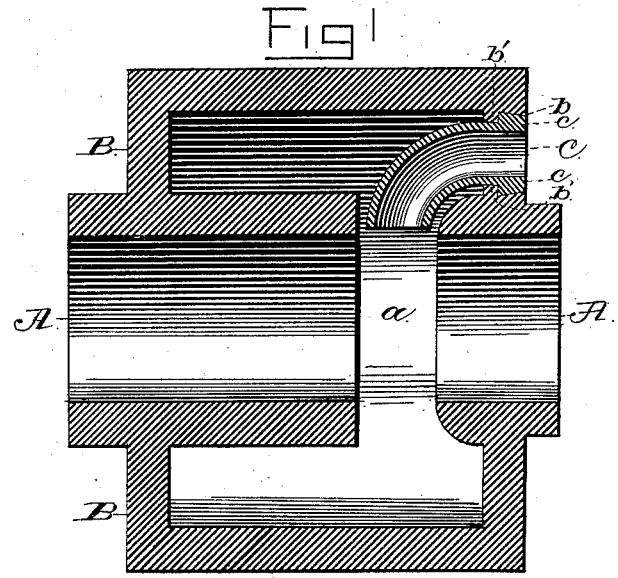
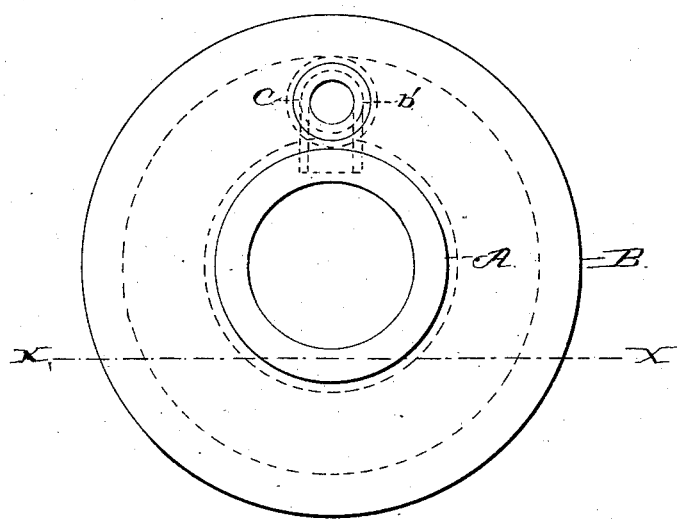
WITNESSES:
Norris A. Clark,
Jno. C. Schroeder
INVENTOR
William R. Jenkins Jr
by Geo W Dyer.
atty

UNITED STATES PATENT OFFICE.

WILLIAM R. JENKINS, JR., OF BELLEFONTE, PENNSYLVANIA.

SELF-LUBRICATING CAR-WHEEL.

SPECIFICATION forming part of Letters Patent No. 307,307, dated October 28, 1884.

Application filed August 30, 1884. (No model.)

*To all whom it may concern:*

Be it known that I, WILLIAM R. JENKINS, Jr., of Bellefonte, in the county of Centre and State of Pennsylvania, have invented a new and useful Improvement in Self-Lubricating Car-Wheels; and I do hereby declare that the following is a full and exact description of the same, reference being had to the accompanying drawings, and to the letters of reference marked thereon.

My improvements relate particularly to car-wheels, pulleys, and other wheels which revolve upon fixed axles or shafts, and more especially such as have an annular oil-reservoir surrounding the inner hub of the wheel or pulley. The object of the improvements is, principally and essentially, to effect a regular uninterrupted flow of oil from the reservoir to the axle or shaft bearings; and to this end the invention consists in the construction and arrangement of parts, all as more fully hereinafter described and claimed.

For the better understanding of my improvements, together with the details of construction and arrangement, attention is invited to the accompanying drawings, in which —

Figure 1 is a vertical central section lengthwise of the hub of a car-wheel with my improved device attached, and Fig. 2 an end view of the same.

Like letters of reference denote corresponding parts in both views.

A denotes the hub of the wheel, cast with an exterior oil-reservoir, B, of suitable dimensions. This hub A is divided or made in two parts, so as to leave an open unobstructed radial space, $a$, which communicates with the oil-reservoir B and serves to conduct the lubricant to the axle or shaft having bearings in said hub. The oil-reservoir B is provided on one of its side walls with an annular opening, $b$, having an interior flange or shoulder, $b'$, located a short distance back from its front end. Between this flange or shoulder $b'$ and the front end of the opening $b$ the walls of the latter are dovetailed or made flaring, as shown in Fig. 1. Through this opening $b$ into the reservoir is inserted a bent tube, C, made preferably of lead or some other ductile metal, and provided on its outer end with an exterior flange, $c$, which, when the tube is properly inserted, abuts against the flange or shoulder $b'$ on the inside of the reservoir B. After this tube C is inserted the flange $c$ is swaged out until it fits tightly within the flaring end of the opening $b$, thus making the joint secure against leakage. The tube C has an unobstructed passage from its inner to its outer end, and said tube should be of such a curvature and length that when inserted into the reservoir its inner end will terminate in the space $a$ between the two parts of the hub, and not quite touch the axle upon which the whole is mounted. Oil being poured in at the outer opening of the tube, it flows through the same to the space $a$ between the two parts of the hub, and thence around the axle into the reservoir B, filling the same up to about the level of the line $x\,x$, Fig. 2.

It will be noticed that the tube requires no stopper or cover to prevent the oil from escaping, for when the wheel is turned so that the opening of the tube is down the inner end will be above the level or surface of the oil in the reservoir; nor can the oil escape when the wheel is in motion, for then the centrifugal force throws the oil around against the inner wall of the exterior casing of the reservoir; and then, again, the inner end of the tube being above the level or surface of the oil, it cannot enter at this point, and all that is taken up by the outer sides of the tube will readily drip off on the axle.

Among the advantages asserted for my improved lubricator are its simplicity and consequent cheapness of construction and the facilities it affords for supplying the lubricant.

What I claim as new, and desire to secure by Letters Patent, is—

1. In a self-lubricating car-wheel, the combination of an exterior oil-reservoir, an interior hub having an opening through to the axle, and a bent tube having an unobstructed passage from end to end and communicating with the opening in said hub, substantially as and for the purpose set forth.

2. In a self-lubricating car-wheel, the combination of an exterior oil-reservoir, an interior hub, made in two parts, and a bent tube having an unobstructed passage from end to end, and terminating at its inner end between the two parts of said hub, substantially as and for the purpose set forth.

3. In a self-lubricating car-wheel, the combination of the hub A, made in two parts, and reservoir B, cast with the same, and provided with opening $b$ and flange $b'$, and the bent tube C, inserted and secured in said opening, substantially as described.

4. In a self-lubricating car-wheel, the combination, with the hub A and reservoir B, provided with opening $b$ and flange $b'$, of the bent tube C, provided on its outer end with the flange $c$ and secured in said opening $b$, substantially as described and shown.

In testimony whereof I affix my signature in presence of two witnesses.

WILLIAM R. JENKINS, JR.

Witnesses:
CHARLES SMITH,
J. L. MONTGOMERY.